United States Patent
Park

(10) Patent No.: US 9,783,659 B2
(45) Date of Patent: Oct. 10, 2017

(54) BIODEGRADABLE COMPOSITION USING CELLULOSE AND PREPARATION METHOD THEREFOR, AND WATERPROOF AGENT AND MOLDED PRODUCT USING COMPOSITION

(71) Applicant: Chan-oh Park, Jeju (KR)

(72) Inventor: Chan-oh Park, Jeju (KR)

(*) Notice: Subject to any disclaimer, the term of this patent is extended or adjusted under 35 U.S.C. 154(b) by 0 days.

(21) Appl. No.: 14/907,774

(22) PCT Filed: Jul. 25, 2014

(86) PCT No.: PCT/KR2014/006777
§ 371 (c)(1),
(2) Date: Jan. 26, 2016

(87) PCT Pub. No.: WO2015/012626
PCT Pub. Date: Jan. 29, 2015

(65) Prior Publication Data
US 2016/0168362 A1      Jun. 16, 2016

(30) Foreign Application Priority Data

| Jul. 26, 2013 | (KR) | 10-2013-0088411 |
| Jul. 27, 2013 | (KR) | 10-2013-0089206 |
| Jul. 5, 2014  | (KR) | 10-2014-0084093 |
| Jul. 23, 2014 | (KR) | 10-2014-0093536 |

(51) Int. Cl.
C08L 1/02    (2006.01)
D21H 17/25   (2006.01)
C08L 97/02   (2006.01)

(52) U.S. Cl.
CPC ............ *C08L 1/02* (2013.01); *C08L 97/02* (2013.01); *D21H 17/25* (2013.01)

(58) Field of Classification Search
CPC ........................................ C08L 1/02
See application file for complete search history.

(56) References Cited

U.S. PATENT DOCUMENTS

| 1,987,212 A * | 1/1935 | Richter ............... D21C 9/1057 162/78 |
| 6,749,718 B2 * | 6/2004 | Takai ................. D21H 25/005 162/109 |
| 2011/0229698 A1 * | 9/2011 | Rasmussen ........... B29C 70/46 428/195.1 |

FOREIGN PATENT DOCUMENTS

| JP | 2011-84709 | 4/2011 |
| KR | 10-2004-0076149 | 8/2004 |
| KR | 10-2008-0042226 | 5/2008 |
| KR | 10-2011-0000483 | 1/2011 |

* cited by examiner

*Primary Examiner* — Melvin C Mayes
*Assistant Examiner* — Stefanie Cohen
(74) *Attorney, Agent, or Firm* — Harness, Dickey & Pierce, P.L.C.

(57) ABSTRACT

There are provided to a biodegradable composition containing ground cellulose having a diameter of 300 μm to 1 nm, pulp, and water, a manufacturing method for the same, and a water-proof agent and a molded product using the composition. A molded product manufactured using the biodegradable composition of the present invention has a water-proofing function and an excellent strength for a certain period of time, and when the molded product is discarded, it is biodegraded without damage to the natural environment.

9 Claims, 1 Drawing Sheet

BIODEGRADABLE COMPOSITION USING CELLULOSE AND PREPARATION METHOD THEREFOR, AND WATERPROOF AGENT AND MOLDED PRODUCT USING COMPOSITION

TECHNICAL FIELD

The present invention relates to a biodegradable composition comprising cellulose, a manufacturing method for the same, and a water-proof agent and a molded products which are manufactured using the composition and excellent in waterproofing property and strength.

BACKGROUND OF THE INVENTION

Conventionally, disposable products (for example, paper cups, disposable diapers, plastic bags, paper lunch boxes, or the like) have been manufactured and used by companies and service companies in various ways. However, such disposable products are mainly made of synthetic plastic as a raw material, and, thus, a disposal process after use thereof has caused a lot of problems such as environmental pollution and the like.

In order to solve such problems, a biodegradable substance (for example, polylactic acid (PLA)) which is biodegradable after use has been developed using a natural material such as corn starch. However, it takes a lot of cost to manufacture such a biodegradable substance. Therefore, such a biodegradable substance is not suitable for industrial mass production, and, thus, it has been limited in application but has not been widely used.

Thus, there has been a demand for alternative substances having a biodegradable property and also excellent in waterproofing property and strength for a certain period of time.

SUMMARY OF THE INVENTION

The object of the present invention is to solve the problems of the prior arts by providing a biodegradable composition and a manufacturing method for the same, and a water-proof agent and a molded product using the composition. The biodegradable composition is manufactured using cellulose, which is the most abundant organic substance on earth, and, thus, a cost of materials can be reduced, and the biodegradable composition is biodegraded after use without damage to the natural environment and useful as a water-proof agent due to its excellent waterproofing property and strength, and also can be substituted for conventional materials such as paper or plastic.

In order to achieve the above object, a biodegradable composition comprises cellulose having a diameter of 300 µm to 1 nm; pulp; and water, wherein a content ratio of the cellulose to the pulp is a weight ratio of the cellulose to the pulp in a range of 1:99 to 99:1, and a content of the water is 50 to 99 weight % with respect to the total weight of the composition.

Herein, among the cellulose having a diameter of 300 µm to 1 nm, one or more of the cellulose different in diameter are mixed.

Also, other water-soluble fibroid materials or plant fibers selected from pectin, alginic acid, guar gum, and agar are added to the cellulose.

The cellulose and the pulp are bleached or dyed.

A manufacturing method for a biodegradable composition comprises the following steps:

first step of preparing comminuted cellulose;
second step of preparing pulp;
third step of preparing water; and
fourth step of manufacturing the composition by mixing the cellulose, the pulp, and the water prepared in the first to third steps, respectively.

Herein, in the first step, the comminuted cellulose is prepared by grinding (isolating) cellulose to have a diameter of 300 µm to 1 nm.

In the first step, among the cellulose having a diameter of 300 µm to 1 nm, one or more of the cellulose different in diameter are mixed.

In the first step and the second step, each of the cellulose and the pulp is bleached or dyed.

In the first step, other water-soluble fibroid materials or plant fibers selected from pectin, alginic acid, guar gum, and agar are added to the cellulose.

If the composition mixed in the first to forth steps [i.e. a composition as a mixture of the cellulose isolated to a nano size, the pulp, and the water] is applied or coated on a target object and then dried (one or more times), a coating film having an excellent waterproofing effect can be formed.

If the composition mixed in the first to forth steps is molded and dried, alternatives to paper, disposable products, or plastic can be manufactured, and as a size of the cellulose to be used decreases, a water-proof time and strength of a finished product increase.

Effect of the Invention

The biodegradable composition of the present invention is manufactured using cellulose and pulp, which are natural materials, without using an adhesive. Therefore, the biodegradable composition is harmless to humans and has a waterproofing effect for a certain period of time after manufacturing, and, thus, it can be practically used in various ways and can be recycled. Further, when the biodegradable composition is discarded, it is biodegraded and thus easily returns to nature. Furthermore, the biodegradable composition can be manufactured by adjusting a water-proof time, strength, and a time for biodegradation depending on a size of ground cellulose and a density of a finished product. Also, the biodegradable composition of the present invention is excellent in a waterproofing effect and thus can be usefully used as a water-proof agent, and a molded product manufactured using the composition of the present invention is manufactured using cellulose, which is the most abundant organic substance on earth and thus can be manufactured at lower costs than plastic or PLA using corn starch.

DETAILED DESCRIPTION OF THE INVENTION

Figure 1:
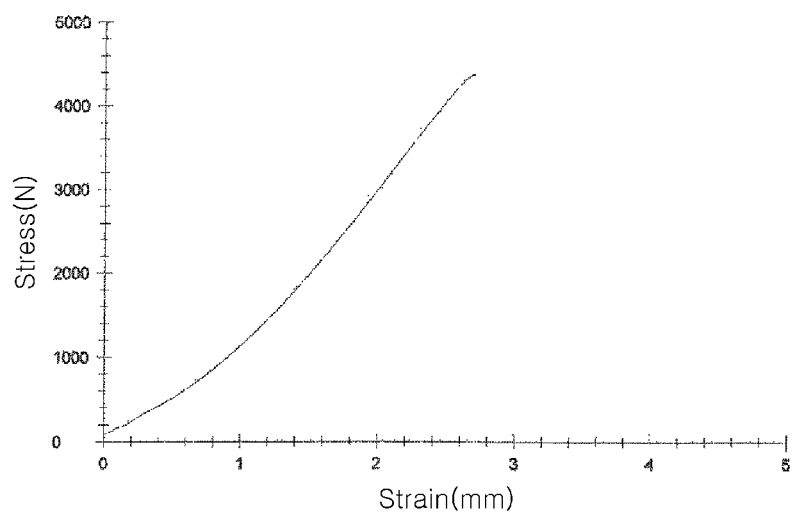
FIG. 1 is a tensile strength test result of a specimen prepared from a composition of the present disclosure.

A biodegradable composition of the present invention comprises cellulose, pulp, and water.

The biodegradable composition of the present invention may comprise one or more of other water-soluble fibroid materials or plant fibers such as pectin, alginic acid, guar gum, agar and the like.

In the biodegradable composition of the present invention, the cellulose and the pulp may be used after bleaching or dyeing depending on the use of a final product.

In the biodegradable composition of the present invention, a content ratio of the cellulose and the pulp which refers to a weight ratio of the cellulose (or the sum of the cellulose and other fibers) to the pulp is 1:99 to 99:1, preferably 10:90 to 90:10, more preferably 30:70 to 70:30, and most preferably 50:50. A content of the water is 50 to 99 weight % and preferably 60 to 90 weight % with respect to the total weight of the composition.

The cellulose used in the present invention is a main component constituting bodies of living things such as plants or marine plants that undergo photosynthesis. In the present invention, a size of the cellulose to be used for manufacturing the composition can be adjusted depending on the use of a final product, and for example, the cellulose may have a diameter of, preferably, 300 μm to 1 nm, or 100 μm to 5 nm.

In a preferable embodiment of the biodegradable composition of the present invention, among the cellulose having a diameter of 300 μm to 1 nm, two or more of the cellulose different in diameter may be mixed.

A manufacturing method for the biodegradable composition of the present invention comprises the following steps:

a first step of preparing comminuted cellulose;

a second step of preparing pulp;

a third step of preparing water; and a fourth step of manufacturing a composition by mixing the cellulose, the pulp, and the water prepared in the first to third steps, respectively.

Hereinafter, the manufacturing method of the biodegradable composition according to the present invention will be explained in detail.

First Step: Step of Preparing Comminuted (Isolated) Cellulose

In the manufacturing method of the biodegradable composition according to the present disclosure, during the first step, ground cellulose is prepared by comminuting (isolating) cellulose to have a diameter of, preferably, 300 μm to 1 nm. The cellulose may be used after bleaching or dyeing depending on the use of a final product. During the present step, one or more of other water-soluble fibroid materials and plant fibers such as pectin, alginic acid, guar gum, agar and the like may be mixed with the cellulose.

Among the cellulose having a diameter of 300 μm to 1 nm, two or more of the cellulose different in diameter may be mixed.

During the present step, a method of grinding cellulose is not particularly limited, and may include, for example, a mechanical grinding method using a machine such as a grinder or a homogenizer, or a chemical method such as acid hydrolysis using acids such as sulfuric acid, hydrochloric acid, phosphoric acid and the like.

A time for the cellulose to be dispersed in the water and a water-proof time and strength of a finished product manufactured using the composition can be regulated by appropriately regulating a size of the cellulose isolated to 300 μm to 1 nm to be used for the composition of the present invention or appropriately mixing the cellulose different in size. As a size of the cellulose to be used decreases, a water-proof time and strength of a finished product increase. Therefore, it is possible to regulate a size of the cellulose to be used for manufacturing the composition depending on the use of a finished product. For example, in order to manufacture a waterproofing product or a semi-permanent product made of a light structure material, preferably, cellulose ground to a nano-size (100 nm to 1 nm) may be used, and in order to manufacture a product that needs to be degraded in a relatively short time, preferably, cellulose having a size of 1 to 300 μm may be used, and among the cellulose having a diameter of 300 μm to 1 nm, one or more of the cellulose different in diameter are mixed, thereby the product can be manufactured by appropriately regulating a water-proof time and strength thereof.

Second Step: Step of Preparing Pulp

Pulp is composed of cellulose obtained from wood or other fiber plants by a mechanical and/or chemical method, and refers to a main material used for manufacturing paper. Pulp includes wood pulp prepared using wood such as needle leaf trees or broad leaf trees, and non-wood pulp. The pulp used in the present invention is not particularly limited in kind, and all kinds of pulp may be used. In order to manufacture a product in need of elasticity and tensile strength, preferably, pulp having a long length and high tensile strength may be used, and in order to manufacture a product which is difficult to mold, preferably, pulp having a short length may be used.

Further, the pulp may be used after bleaching or dyeing depending on the use of a final product.

Third Step: Step of Preparing Water

In the present invention, water is an essential element for forming hydrogen bonds between cellulose molecules. However, since drainage (dewatering) or drying should be carried out when a product is manufactured, preferably, the minimum amount of water may be used within the limit where hydrogen bonds can be formed or within the limit required for molding a final product in order to reduce a time for manufacturing a product. Further, the cellulose may be present in water-suspension state during the comminuting (isolation) step depending on a grinding method. If the comminuted cellulose is in a water-suspension state, during the present third step, the water may not be additionally mixed or an amount of the water may be mixed in a regulated concentration suitable for the use of a final product to be manufactured and then mixed.

Fourth Step: Step of Mixing

In the present mixing step, a composition is manufactured by mixing the cellulose, the pulp, and the water prepared in the first step to the third step, respectively. The mixing does not require a particular method, and may be easily carried out using a conventional machine such as a mixer, a blender, or a kneader. Herein, a mixing ratio of the cellulose to the pulp is not limited and can be freely regulated in consideration of the use of a product to be manufactured or a time for biodegradation. In consideration of a biodegradable property, a waterproofing property, and strength, preferably, a weight ratio is 1:99 to 99:1, or 30:70 to 70:30, and particularly 50:50. A content of the water may be 50 to 99 weight % with respect to the total weight of the composition.

If the biodegradable composition [i.e. a composition as a mixture of the cellulose isolated to a nano size, the pulp, and the water] of the present invention is applied or coated on a target object and then dried, a coating film having an excellent waterproofing effect can be formed. Therefore, the biodegradable composition of the present invention can be usefully used as a waterproofing agent.

Further, the present invention provides a molded product to be manufactured using the biodegradable composition of the present invention. The molded product is manufactured using hydrogen bonds between cellulose molecules and is not limited in kind as long as it is manufactured using the biodegradable composition of the present invention and may include, for example, alternatives to paper, disposable products, and plastic, or the like. A manufacturing method of each product is not particularly limited, and a typical manufacturing method of each product can be applied. If various molding machines for different uses are manufactured by applying a typical manufacturing method, various products can be manufactured using them.

As a specific example, if paper is manufactured using the composition of the present invention, the conventional method used for manufacturing paper may be used. The paper making method includes a handmade paper making method and mechanical paper making methods (for example, the fourdrinier paper making method, the cylinder type paper making method and the like), and all of these methods can be used. To be specific, the composition (cellulose+pulp+water) of the present invention is transferred to a water permeable wire mesh to drain the water, and the mixture of the cellulose and the pulp is entangled so as to form a layer. Then, the layer of the mixture is compressed and dried to be uniform. Through this process, biodegradable paper and waterproofing paper (paper having a high oil resistance and a high water resistance as an alternative to vinyl) can be manufactured.

As another specific example, if a disposable product is manufactured using the composition of the present invention, a general method for manufacturing a disposable product using pulp may be used. To be specific, on a molding frame having a shape to be manufactured (for example, a frame having a draining function with a small gynecomorphous drainage hole), a water permeable wire mesh having the same shape is placed, and then, the composition of the present invention is transferred to the water permeable wire mesh to drain the water, and the mixture of the cellulose and the pulp is entangled so as to form a layer. Then, the layer of the mixture is compressed and dried by an andromorph (smaller than a gynecomorphous molding frame by a thickness of a layer of a product) having the same shape as the molding frame so as to manufacture the product.

Herein, in the molding frame, the gynecomorphous drainage hole may be changed to an andromorphous drainage hole on the contrary to the above example, and in this case, a water permeable wire mesh having the same shape may be inserted into the andromorph. Further, in the above-described method, drainage and compression may be carried out at the same time, or a compression process may be repeated one or more times to manufacture a product. It is desirable to dry the layer while being compressed since strain of a finished product can be minimized.

As yet another example, if a molded product as an alternative to plastic is manufactured using the composition of the present invention, the molded product may be manufactured by manufacturing a molding machine (molding frame) in which the composition of the present invention is mixed to be in a paste state and put into the molding frame having a drainage hole and then compressed to drain water by force, and while the compression is carried out, the substance to be molded is dried in the molding frame until the compression is completed, thereby gradually reducing a volume of the product (that is, draining water by adding heat and leaving fiber having a high density) and thus manufacturing the molded product. Herein, water generated during compression or vapor generated during drying may be drained through a water permeable wire mesh or a filter (as a preferable example, a filter manufactured using fiber or pulp), or may be drained using both of the water permeable wire mesh and the filter. Further, in the case of using the filter, preferably, a non-woven fabric for drainage or other subsidiary materials are attached between the filter and a molded product in order to make it easy to separate the filter from the molded product.

A density of the molded product manufactured using the composition of the present invention is an important factor that determines a time for biodegradation, a water-proof time, and strength of the molded product. A product can be manufactured by adjusting a density of the product by regulating a content of the cellulose or a pressure for compression during the manufacturing process of the product. A volume or a mass of a finished product is the same as that of a pre-molding mixture from which an amount of water is subtracted, and, thus, it can be adjusted by regulating an amount of a mixture before molding.

EXAMPLES

Hereinafter, the present invention will be explained in detail with reference to Examples, but these Examples are provided only for illustrating but not for limiting the present disclosure.

Examples 1 to 5

As illustrated in Table 1 to Table 5 below, each sheet of paper (average basis weight: 76.47 g/m$^2$) was prepared by a handmade paper making method using biodegradable compositions prepared with different content ratios between cellulose and pulp and different sizes of cellulose. A waterproofing property test and a strength test of each sheet of paper prepared were carried out. The results thereof were as illustrated in Table 1 to Table 5. The waterproofing property test was carried out by pouring water to paper and measuring a time for water to ooze out on a rear surface. The test on strength was carried out according to KS M ISO 1924-2 "Testing Method of Tensile Strength of Paper and Paperboard", and the test on tensile strength was carried out according to the constant rate of loading method under average MD of 5.29 KN/m and CD of 2.18 KN/m. For reference, plain paper (wood-free paper) typically has a water-proof time in a range of 10 to 30 seconds.

TABLE 1

| Classification | Cellulose:pulp mixing ratio (weight ratio) | Cellulose size (diameter) | Water-proof time of paper prepared | Tensile strength of paper prepared (MD):KN/m |
|---|---|---|---|---|
| Example 1-1 | 10%:90% | Mixed in a range of 300 μm to 10 μm | 10 seconds to 30 seconds | About 5 |
| Example 1-2 | 10%:90% | Mixed in a range of 10 μm to 100 nm | 30 seconds to 45 seconds | About 5 |
| Example 1-3 | 10%:90% | Mixed in a range of 100 nm to 1 nm | 45 seconds to 1 minute | 5 to 7 |
| Example 1-4 | 10%:90% | Mixed in a range of 300 μm to 1 nm | 10 seconds to 1 minute | 5 to 7 |

TABLE 2

| Classification | Cellulose:pulp mixing ratio (weight ratio) | Cellulose size (diameter) | Water-proof time of paper prepared | Tensile strength of paper prepared (MD):KN/m |
|---|---|---|---|---|
| Example 2-1 | 30%:70% | Mixed in a range of 300 μm to 10 μm | 10 seconds to 30 seconds | About 5 |
| Example 2-2 | 30%:70% | Mixed in a range of 10 μm to 100 nm | 30 seconds to 1 minute | 5 to 6 |
| Example 2-3 | 30%:70% | Mixed in a range of 100 nm to 1 nm | 1 minute to semi-permanent | 6 to 10 |
| Example 2-4 | 30%:70% | Mixed in a range of 300 μm to 1 nm | 10 seconds to semi-permanent | 5 to 10 |

TABLE 3

| Classification | Cellulose:pulp mixing ratio (weight ratio) | Cellulose size (diameter) | Water-proof time of paper prepared | Tensile strength of paper prepared (MD):KN/m |
|---|---|---|---|---|
| Example 3-1 | 50%:50% | Mixed in a range of 300 μm to 10 μm | 10 seconds to 30 seconds | About 5 |
| Example 3-2 | 50%:50% | Mixed in a range of 10 μm to 100 nm | 30 seconds to 2 minutes | 5 to 7 |
| Example 3-3 | 50%:50% | Mixed in a range of 100 nm to 1 nm | 2 minutes to semi-permanent | 7 to 15 |
| Example 3-4 | 50%:50% | Mixed in a range of 300 μm to 1 nm | 10 seconds to semi-permanent | 5 to 15 |

TABLE 4

| Classification | Cellulose:pulp mixing ratio (weight ratio) | Cellulose size | Water-proof time of paper prepared | Tensile strength of paper prepared (MD):KN/m |
|---|---|---|---|---|
| Example 4-1 | 70%:30% | Mixed in a range of 300 μm to 10 μm | 30 seconds to 1 minute | About 5 |
| Example 4-2 | 70%:30% | Mixed in a range of 10 μm to 100 nm | 1 minute to 3 minutes | 5 to 6 |
| Example 4-3 | 70%:30% | Mixed in a range of 100 nm to 1 nm | 3 minutes to semi-permanent | 6 to 10 |
| Example 4-4 | 70%:30% | Mixed in a range of 300 μm to 1 nm | 30 seconds to semi-permanent | 5 to 10 |

TABLE 5

| Classification | Cellulose:pulp mixing ratio (weight ratio) | Cellulose size | Water-proof time of paper prepared | Tensile strength of paper prepared (MD):KN/m |
|---|---|---|---|---|
| Example 5-1 | 90%:10% | Mixed in a range of 300 μm to 10 μm | 30 seconds to 1 minute | About 5 |
| Example 5-2 | 90%:10% | Mixed in a range of 10 μm to 100 nm | 1 minute to 4 minutes | About 5 |
| Example 5-3 | 90%:10% | Mixed in a range of 100 nm to 1 nm | 4 minutes to semi-permanent | 5 to 7 |
| Example 5-4 | 90%:10% | Mixed in a range of 300 μm to 1 nm | 30 seconds to semi-permanent | 5 to 7 |

It could be confirmed from the above results as illustrated in Table 1 to Table 5 that the biodegradable composition of the present invention has an excellent waterproofing property and also has a much higher strength than the conventional one. Therefore, it can be seen that the biodegradable composition of the present invention is suitable to be used as a waterproofing agent or a material of products in need of a waterproofing property.

Further, the results as illustrated in Table 1 to Table 5 involve the case of preparing paper by the handmade paper making method. If a density of paper is increased by a mechanical paper making method, it is possible to further increase a water-proof time and strength.

Furthermore, a specimen was manufactured using the composition of Example 3-3 and a conventional plastic (high density polyethylene (HDPE)) was used as a control. Then, a tensile strength of each specimen was measured according to KS B 0802 (Testing Method of Tensile Strength of Metallic Material). The results thereof were illustrated in FIG. 1 (the specimen manufactured using the composition of Example 3-3 of the present disclosure) and FIG. 2 (the plastic specimen as a control).

Figure 2:
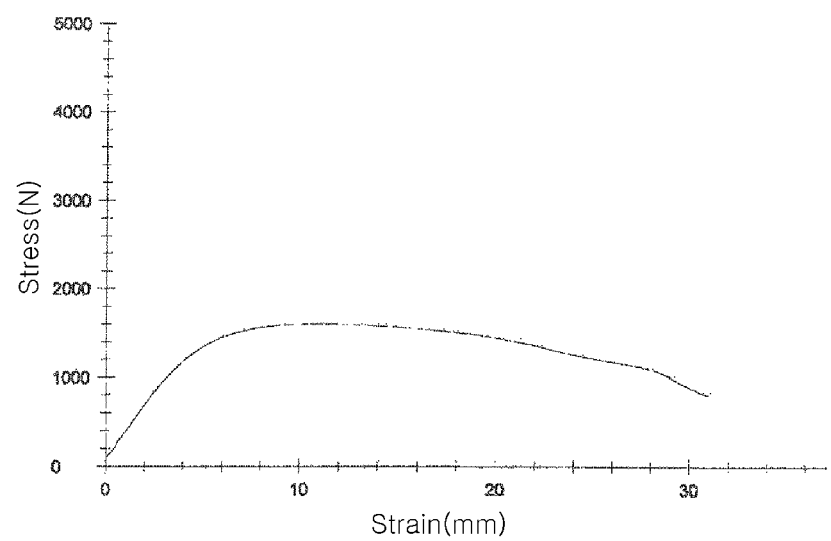
FIG. 2 is a tensile strength test result of a specimen prepared from conventional plastic (high density polyethylene (HDPE)).

As can be seen from FIG. 1 and FIG. 2, it is confirmed that the specimen manufactured using the composition of the present invention has an excellent tensile strength and can be usefully used as an alternative to the conventional plastic.

INDUSTRIAL APPLICABILITY

The US and European countries have been focusing on developing bio-plastics using starch. However, due to the price increase of the grain, they are now making efforts on developing the raw materials to replace it.

A modeled product that is manufactured using the composition of the present invention is manufactured using cellulose, which is the most abundant organic substance on earth, and therefore has the advantage of low production costs, compared to using plastic or PLA of corn starch.

It is also excellent in strength as plastic and can endure at a high temperature of 150-200° C.; it also can manufacture disposable products or semi-permanent products including light weight construction products (floor products, interior/exterior materials, furniture materials, electric home appliances, toys for children, etc.).

As it is getting difficult to use crude oil, starch, and trees as raw materials due to the exhaustion of natural resources and Convention on Climate Change, the present invention would be useful in securing the raw materials by using a herbaceous plant as main materials in terms of securing and using the future resources. It also provides saving of the natural resources such as crude oil and starch, and has a great potential to develop into a new future industry.

What is claimed is:

1. A manufacturing method for a waterproof molded product comprising a biodegradable composition,
   wherein the biodegradable composition comprises:
   cellulose having a diameter of 300 mm to 1 nm;
   pulp; and
   water,
   wherein the water content ratio of the cellulose to the pulp is a weight ratio of the cellulose to the pulp in a range of 1:99 to 99:1, and a content of the water is 50 to 99 weight % with respect to the total weight of the composition,
   wherein the method comprises the following steps:
   first step of preparing comminuted cellulose;
   second step of preparing pulp;
   third step of preparing water;
   fourth step of manufacturing the composition by mixing the cellulose, the pulp, and the water prepared in the first to third steps, respectively; and
   fifth step of molding the biodegradable composition of step four into a waterproof molded product.

2. The manufacturing method of claim 1, wherein among the cellulose having a diameter of 300 μm to 1 nm, one or more of the cellulose different in diameter are mixed.

3. The manufacturing method of claim 1, wherein other water-soluble fibroid materials or plant fibers selected from pectin, alginic acid, guar gum, and agar are added to the cellulose.

4. The manufacturing method of claim 1, wherein the cellulose and the pulp are bleached or dyed.

5. The manufacturing method of claim 1, wherein in the first step, the comminuted cellulose is prepared by grinding (isolating) cellulose to have a diameter of 300 μm to 1 nm.

6. The manufacturing method of claim 1, wherein in the first step, among the cellulose having a diameter of 300 μm to 1 nm, one or more of the cellulose different in diameter are mixed.

7. The manufacturing method of claim 1, wherein in the first step and the second step, each of the cellulose and the pulp is bleached or stained.

8. The manufacturing method of claim 1, wherein in the first step, other water-soluble fibroid materials or plant fibers selected from pectin, alginic acid, guar gum, and agar are added to the cellulose.

9. The manufacturing method of claim 1, wherein the waterproof molded product comprises a paper, a disposable product, or an alternative to plastic.

* * * * *